June 28, 1949.                J. L. RAY                2,474,324
                              GOVERNOR
                         Filed March 9, 1945

Inventor
James L. Ray
by W. A. Lieber
Attorney

Patented June 28, 1949

2,474,324

UNITED STATES PATENT OFFICE 2,474,324

GOVERNOR

James L. Ray, Elm Grove, Wis., assignor to Allis-Chalmers Manufacturing Company, Milwaukee, Wis., a corporation of Delaware Application March 9, 1945, Serial No. 581,833

11 Claims. (Cl. 264—17)

The present invention relates generally to improvements in governors, and relates more particularly to improvements in the construction and operation of speed governors of the centrifugally operated type.

Centrifugally operated governing mechanisms usually consist of a weight device which is carried by a rotary member, such as the shaft of the machine or engine to be governed, and is adapted to be moved away from the axis of rotation by centrifugal force against a spring or other suitable yielding resistance. The yielding resistance against which the weight device is adapted to move by centrifugal force is so selected that when the rotary member reaches a predetermined speed of rotation, the weight device will act to accomplish certain work. The weight device may comprise a set of flyballs, a plunger or similar means suitably positioned.

Prior governing devices, wherein a plunger or the like is utilized as the weight, have been so constructed that the plunger or similar sliding member is yieldingly retained, as by means of a spring, in inoperative position within a transverse slot or other suitable housing formed within the rotary member. In such prior devices, the adjustment of the plunger or similar weight device for response at certain predetermined speeds has heretofore commonly been effected either by varying the resiliency of the spring or by varying the location of the center of gravity by means of an auxiliary weight adjustably mounted within the plunger constituting the main weight.

In governing mechanisms of such commonly used spring-held plunger type, the plunger is moved away from the axis of rotation of the rotary member when the centrifugal force becomes sufficient to overcome the resistance established by the spring and tending to hold the plunger in inoperative position. As the plunger or the like is so moved by centrifugal force, the nose portion of the plunger is usually caused to project beyond the confines of the plunger housing a sufficient distance to do certain required work. Ordinarily this work is in the nature of a hammering action wherein the projecting nose portion of the plunger, while revolving with the rotary member at a relatively high speed, is caused to strike a lever or other suitable device constructed and arranged to perform any required function at that speed of the machine.

Primarily because of the relatively rough treatment and abuse to which the plunger or other weight member is subjected during operation, as hereinabove described, and also because of the size of the spring and relatively heavy load necessary to resiliently restrain outward movement of the weight in such prior art devices, it has heretofore been extremely difficult to obtain a highly sensitive governing device of this type wherein a fine degree of adjustment within narrow speed ranges may be effected. In many cases, it has, in fact, been impossible to obtain a desired sensitivity and degree of adjustment with these prior devices despite careful machining of parts within close tolerances and careful initial adjustments of the springs and the like. When the plunger in such governing devices imparts a blow to the lever, switch, or the like while traveling at high speed, a dent may be formed on the surface of the plunger or other weight or in the wall of the housing. Likewise, foreign matter may be picked up by the plunger and caused to adhere to the surface thereof when the plunger is returned to inoperative position within the housing. When either the plunger or its adjacent housing wall is dented or otherwise marred or when dirt or other foreign matter is caused to enter the housing with the plunger, the result frequently is that free movement of the plunger with respect to its housing is impaired and consequently an accurate adjustment of the device within a narrow speed range cannot be attained. This sticking of the plunger within its housing is most likely to occur after the governing device has been inactive for some period of time, as is frequently the case, and even the slightest tendency of the parts to stick in one position interferes with the sensitivity of the device.

It is therefore an object of the present invention to provide an improved governing mechanism of the centrifugally operated type which is highly sensitive and which may be readily adjusted over a wide range to respond within extremely close limits.

Another object of my invention is to provide an improved governor for a rotary member wherein the main weight may be positioned with its center of gravity substantially coincident with the axis of rotation of the rotary member, thereby requiring only a light load on the main restraining spring.

Another object of the invention is to provide an improved mechanical governor wherein the movement of the main weight is positively initiated by an auxiliary or pilot weight at a predetermined speed of rotation.

Another object of the present invention is to provide an improved governor for a rotary member comprising a main weight supported by the rotary member for movement laterally relative to the axis of rotation of the rotary member and means constituting an auxiliary weight movable to shift the main weight away from the axis of rotation upon attainment of a predetermined speed of rotation.

Still another object of this invention is to provide an improved centrifugal governor wherein the main weight is provided with resilient means tending to resist movement thereof away from the axis of rotation and the auxiliary weight for shifting the main weight away from the axis is provided with resilient means tending to resist movement of the auxiliary weight away from the axis independently of the first mentioned resilient means.

A further object of the present invention is to provide an improved governing device wherein the center of gravity of the main weight is caused to shift by the movement of an auxiliary or pilot weight housed within and formed coaxial with the main weight.

An additional object of the present invention is to provide an improved centrifugal governor which is simple and compact in construction, which may be readily applied and adjusted, which may be economically manufactured and sold, and which is nevertheless highly efficient in operation.

Additional objects and advantages of the present invention, including those concerned with the provision of a plurality of means constructed and combined in a manner such that when a rotating member mounting said means attains a predetermined speed of rotation the center of gravity of the main weight or part is automatically shifted away from the axis of rotation of such member and the main weight or part is substantially simultaneously subjected to an impact force acting in line with and augmenting the centrifugal force acting on such main part or weight, will be apparent from the following detailed description.

A clear conception of one embodiment of the present improvement and of the mode of constructing and of utilizing devices built in accordance with my invention may be had by referring to the drawing accompanying and forming a part of this specification, wherein like reference characters designate the same or similar parts in the various views.

Figure 2:
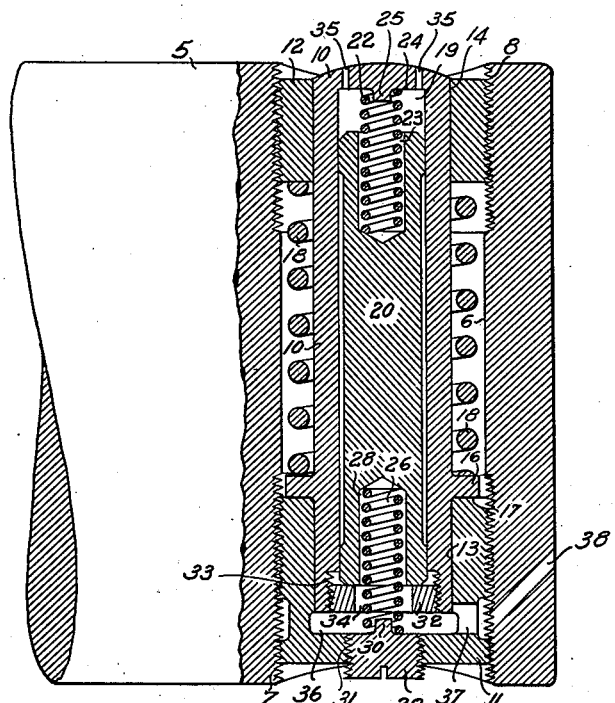
Fig. 2 is an enlarged sectional view through the shaft and governing device taken along the line II—II of Fig. 1.

Referring to the drawing, the improved governing device is illustrated as being applied to a rotary shaft 5 which may be driven by the engine or the like to be governed (not shown). The shaft 5 is provided with a transverse bore or slot which forms a housing 6 for the governing mechanism hereinafter described. The housing 6 extends entirely through the shaft and is provided with screw threads 7, 8 at the opposite ends thereof.

The main weight or plunger 10 of the governor is mounted within the transverse housing 6 for sliding movement between a cap 11 and a ring 12 which are formed for threaded engagement with the screw threads 7, 8, respectively, of the housing. The cap 11 is of cup-shaped formation having a central well 13 of sufficient diameter to receive and guide one end of the main weight 10 therein, and the ring 12 is provided with a through opening 14 formed coaxial with the well 13 and likewise of sufficient diameter to embrace and guide the weight 10. The weight or plunger 10 is provided with an integral annular flange 16 formed for coaction with the lip 17 surrounding the well 13 of the cap 11, thereby positively limiting sliding movement of the weight in one direction; and the flange 16 is resiliently urged toward the lip 17 of the cap under tension of a spring 18 positioned between the flange 16 and the inner face of the ring 12, thereby normally yieldingly retaining the weight 10 entirely within the confines of the housing 6.

The weight or plunger 10 is formed with an internal bore or the like forming a chamber 19 housing an auxiliary or pilot weight 20 which is coaxial with the main weight 10. The auxiliary weight 20 is preferably in the form of a plunger slidably movable within the chamber or housing 19 against the resistance of a spring 22 under tension extending from within a bore 23 formed in the auxiliary weight 20 to the end wall 24 of the chamber or housing 19. To prevent displacement of the spring 22, a knob 25 is formed on the wall 24 centrally of the spring.

The tendency of the spring 22 to resist sliding movement of the auxiliary weight 20 may be varied through the expedient of a spring 26 coacting with an end bore 28 in the auxiliary weight and the inner surface of an adjusting screw 29 which is provided with a knob 30 for preventing displacement of the spring 26. The screw 29 is received within the tapped hole 31 in the cap 11 and is, of course, movable axially upon rotation thereof in the usual manner, thereby varying the net tension of the opposing springs 22, 26. To position and form a positive stop for the auxiliary weight 20 and to house the weight 20 entirely within the main weight 10, a threaded adjusting ring 32 coacting with screw threads 33 in the open end of the weight or hollow part 10 is provided. The ring 32 is formed with a central opening 34 of smaller diameter than the diameter of the auxiliary weight 20 but somewhat larger than the external diameter of the spring 26.

To permit movement of the auxiliary weight or plunger 20 within its housing 19 against the yielding resistance of the springs 22, 26 during operation of the device, it is necessary to vent both ends of the housing 19 to atmosphere. This may be accomplished in any suitable manner, and I have shown one end of the auxiliary weight 20 open to the atmosphere by way of ports 35 formed in the nose of the main weight 10 and with the opposite end vented by way of the opening 34 in the ring 32 which communicates with a chamber 36 formed in the well of the cap 11 which is, in turn, in open communication with the atmosphere by way of ports 37, 38 formed in the cap 11 and shaft 5, respectively.

Figure 1:
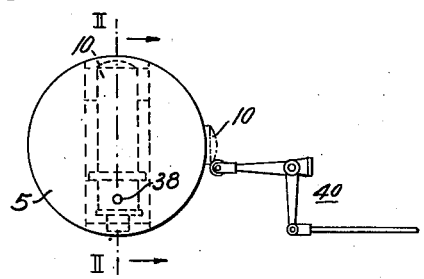
Fig. 1 is an end view of a rotary shaft embodying the invention.

In operation, the device may first be adjusted for response at a desired speed by positioning the auxiliary weight within its housing through the expedient of the threaded adjusting ring 32 and thereafter adjusting the screw 29 and spring 26 in an obvious manner. By such adjustment, the position of the auxiliary weight within its housing and the net tension of the opposing springs 22, 26 may be varied, thereby locating the center of gravity of the auxiliary weight with respect to the axis of rotation of the rotary shaft and likewise establishing the desired resistance to movement of the auxiliary weight. As the shaft or other rotary member is rotated, both the main weight and the auxiliary weight remain in inactive position within their respective housings by reason of the resistance of the springs to movement thereof until attainment of the speed for which the device has been adjusted. Upon attainment of such predetermined speed, the tendency of the spring 22 to urge the auxiliary weight toward the axis of rotation of the rotary member is overcome by the centrifugal force acting thereon; and the auxiliary weight is moved within its housing against the resistance of the spring 22, thereby shifting the center of gravity of the main weight while striking the end wall 24. Upon the occurrence of such shift of the center of gravity and because of the blow which is struck by the auxiliary weight, the resistance of the main spring, tending to urge the main weight toward the axis of rotation of the rotary member, is overcome; and the main weight consequently moves outwardly laterally relative to the axis of rotation of the rotary member. In other words, when member 5 attains a predetermined speed of rotation the auxiliary weight or means 20 moves relative to the main weight or part 10 and automatically shifts the center of gravity of such main weight away from the axis of rotation of such member and substantially simultaneously subjects the main weight to an impact force acting in line with and augmenting the centrifugal force acting on such main weight in opposition to the resilient means or spring 18. As the main weight moves away from the axis of rotation, it is called upon to perform certain work, which has been shown in Fig. 1 as the actuation of a lever or switch mechanism designated generally by the numeral 40, the projecting nose portion of the main weight acting to trip the lever or switch as the shaft rotates.

From the foregoing detailed description, it will be apparent that the present invention provides an improved governor for a rotary member wherein means, which may be readily adjusted to respond within extremely close limits, are provided for positively initiating movement of the main weight. Since the center of gravity of the main weight in the improved device is shifted by the auxiliary or pilot weight upon attainment of a predetermined speed of rotation, the center of gravity of the main weight may advantageously be located at or near the axis of rotation on either side thereof. Consequently the tension of the main spring may be very light, sufficient only to retain the weight on its seat until the center of gravity is shifted by the auxiliary weight. The center of gravity of the auxiliary weight is to one side of the axis of rotation with the movement of such weight resiliently restrained by an independent and highly sensitive spring, and the auxiliary weight may be carried within its housing so as to have very little friction effect and correspondingly high sensitivity. Wide ranges of adjustment of the device may obviously be obtained by varying the position and center of gravity of the main weight as well as the tension of the main spring 18 through adjustments of the cap 11 and ring 12. Such adjustments may be effected independently of the auxiliary weight adjustments, and any suitable known means for effecting the various adjustments with wrenches or similar tools may be provided.

It should be noted that the auxiliary weight and its related parts are housed entirely within the main weight and are therefore protected from injury, and the springs 22, 26 do not carry the auxiliary weight between them but merely constitute a means for varying the resistance to movement of the auxiliary weight after the position of the auxiliary weight and the location of the center of gravity thereof have been established. The improved device consists of relatively few parts which do not require careful machining for effective operation, and governors constructed in accordance with my invention may be readily installed with all parts easily accessible for replacement, if necessary. Because of the light springs which may be utilized for effecting adjustments of the auxiliary weight and also due to the positive action of the auxiliary weight upon shifting and striking the main weight to initiate movement thereof upon attainment of the predetermined speed of rotation, the governor is extremely sensitive in that it is capable of fine adjustments, and at the same time, it is very rugged and capable of withstanding considerable abuse. While the device has been shown and described as being housed in a particular manner within a rotary shaft, it may obviously be suitably applied to other rotary members. The invention may likewise obviously be applied to centrifugal governors other than the spring held plunger type as illustrated and described.

It should therefore be understood that it is not desired to limit the present invention to the exact details of construction or to the precise mode of operation herein shown and described, since various modifications within the scope of the claims may occur to persons skilled in the art.

It is claimed and desired to secure by Letters Patent:

1. A governor comprising a rotary member, an elongated hollow part mounted on said member for reciprocation in the direction of elongation along a path extending laterally of and intersecting the axis of rotation of said member, a first resilient means tending to resist a centrifugal force produced movement of said part and normally effective to retain same in a position such that its center of gravity is disposed in substantial coincidence with said axis, a weight disposed within said hollow part for movement longitudinally therein from a first position wherein the center of gravity of said weight is disposed adjacent said axis to a second position wherein the center of gravity of said weight is sufficiently remote from said axis to shift the center of gravity of the combined mass of said weight and part away from said axis, and a second resilient means disposed within said part and reacting against said hollow part and said weight to retain said weight in said first position until said member attains a predetermined speed of rotation.

2. A governor comprising a rotary member, an elongated hollow part mounted on said member for reciprocation in the direction of elongation along a path extending laterally of and intersecting the axis of rotation of said member, a first resilient means tending to resist a centrifugal force produced movement of said part in a given direction and normally effective to retain same in a position such that its center of gravity is disposed in substantial coincidence with said axis, a weight disposed within said hollow part for movement longitudinally therein, a second resilient means disposed within said part and reacting against said hollow part and said weight to resist a centrifugal force produced movement of said weight in said direction relative to said part and normally effective to retain said weight in a position such that its center of gravity is disposed adjacent said axis so long as said member is rotated at less than a predetermined speed, and means for severally adjusting the tension of said second resilient means and the at-rest position of said weight relative to said part.

3. A governor, comprising: a rotary member; first means mounted on said member for movement relative to the axis of rotation of said member in response to centrifugal force; resilient means opposing the centrifugal force acting on said first means when said member is rotating; auxiliary means mounted on said member for movement relative to said axis of rotation in response to centrifugal force; and means whereby centrifugally-caused movement of said auxiliary means augments the force tending to move said first means in response to centrifugal force.

4. A governor, comprising: a rotary member; first means mounted on said member for movement relative to the axis of rotation of said member in response to centrifugal force; resilient means opposing the centrifugal force acting on said first means when said member is rotating; auxiliary means mounted on said member for movement relative to said axis of rotation in response to centrifugal force; and means whereby centrifugally-caused predetermined movement of said auxiliary means subjects said first means to impact acting in line with and augmenting the force tending to move said first means in response to centrifugal force.

5. A governor, comprising: a rotary member; first means mounted on said member for movement relative to the axis of rotation of said member in response to centrifugal force; resilient means opposing a centrifugally produced movement of said first means and normally effective to retain said first means in a position such that its center of gravity is disposed in proximity to said axis; auxiliary means mounted on said member for movement relative to said axis of rotation in response to centrifugal force; and means whereby centrifugally-caused movement of said auxiliary means in response to said member attaining a predetermined speed of rotation moves said first means so that is center of gravity is shifted away from said axis.

6. A governor, comprising: a rotary member; first means mounted on said member for movement relative to the axis of rotation of said member in response to centrifugal force; resilient means opposing a centrifugally produced movement of said first means and normally effective to retain said first means in a position such that its center of gravity is disposed in proximity to said axis; auxiliary means mounted on said member for movement relative to said axis of rotation in response to centrifugal force; and means whereby centrifugally-caused movement of said auxiliary means in response to said member attaining a predetermined speed of rotation moves said first means so that its center of gravity is shifted away from said axis and augments the force tending to move said first means in response to centrifugal force.

7. A governor, comprising: a rotary member; first means mounted on said member for movement relative to the axis of rotation of said member in response to centrifugal force; resilient means opposing a centrifugally produced movement of said first means and normally effective to retain said first means in a position such that its center of gravity is disposed in proximity to said axis; auxiliary means mounted on said member for movement relative to said axis of rotation in response to centrifugal force; and means whereby centrifugally-caused movement of said auxiliary means in response to said member attaining a predetermined speed of rotation subjects said first means to impact and moves said first means so that its center of gravity is shifted away from said axis.

8. A governor comprising a rotary member, an elongated hollow part mounted on said member for reciprocation in the direction of elongation along a path extending laterally of and intersecting the axis of rotation of said member, a first resilient means tending to resist a centrifugal force produced movement of said part in a given direction and normally effective to retain same in a position such that its center of gravity is disposed in substantial coincidence with said axis, a weight disposed within said hollow part for movement longitudinally therein, and a second resilient means disposed within said part and reacting against said hollow part and said weight to resist a centrifugal force produced movement of said weight in said direction relative to said part and normally effective to retain said weight in a position such that its center of gravity is disposed adjacent said axis so long as said member is rotated at less than a predetermined speed.

9. A governor comprising a rotary member, a main weight mounted on said member for movement laterally of the axis of rotation of said member, resilient means opposing a centrifugal force produced movement of said main weight and normally effective to retain said weight in a position that its center of gravity is disposed in proximity to said axis, an auxiliary weight mounted for centrifugal force produced movement relative to said main weight from a first position wherein the center of gravity of said auxiliary weight is adjacent said axis to a second position wherein the center of gravity of said auxiliary weight is sufficiently remote from said axis to shift the center of gravity of the combined mass of said weights away from said axis in the same direction as the shift in the center of gravity of said auxiliary weight, and an additional resilient means operative to retain said auxiliary weight in said first position until said member attains a predetermined speed of rotation.

10. A governor for a rotary member comprising, a main weight supported by said rotary member for movement laterally relative to the axis of rotation of said rotary member, resilient means tending to resist a centrifugal force produced movement of said main weight and normally maintaining the center of gravity of said main weight substantially coincident with said axis when said rotary member is at rest, an auxiliary weight mounted for centrifugal force produced movement relative to said main weight, means whereby said movement of said auxiliary weight is effective to shift said main weight away from said axis in response to said member attaining a predetermined speed of rotation, an additional resilient means tending to resist said centrifugal force produced movement of said auxiliary weight, and means for adjusting the tension of said additional resilient means and for varying the location of the center of gravity of said auxiliary weight.

11. A governor for a rotary member comprising, a main weight supported by said rotary member for movement laterally relative to the axis of rotation of said rotary member, resilient means tending to resist a centrifugal force produced movement of said main weight and normally maintaining the center of gravity of said main weight substantially coincident with said axis when said rotary member is at rest, an auxiliary weight mounted for centrifugal force produced movement relative to said main weight, means whereby said movement of said auxiliary weight is effective to shift said main weight away from said axis in response to said member attaining a predetermined speed of rotation, an additional resilient means tending to resist said centrifugal force produced movement of said auxiliary weight, means for varying the location of the center of gravity of said auxiliary weight, and separate means for varying the tension of said additional resilient means.

JAMES L. RAY.

REFERENCES CITED

The following references are of record in the file of this patent:

UNITED STATES PATENTS

| Number | Name | Date |
|---|---|---|
| 1,092,968 | Bentley | Apr. 14, 1914 |
| 1,537,694 | Rigsby | May 12, 1925 |
| 1,548,666 | Dickinson | Aug. 4, 1925 |
| 1,622,100 | Flanders | Mar. 22, 1927 |
| 1,666,490 | Dryer | Apr. 17, 1928 |
| 1,756,850 | Coughey | Apr. 29, 1930 |
| 1,928,476 | Baur | Sept. 26, 1933 |
| 2,388,282 | Otto | Nov. 6, 1945 |